United States Patent [19]

Choi

[11] Patent Number: 5,761,794
[45] Date of Patent: Jun. 9, 1998

[54] APPARATUS FOR AUTOMATICALLY PRESS-FITTING A TURNTABLE

[75] Inventor: Young-Suk Choi, Seoul, Rep. of Korea

[73] Assignee: Daewoo Electronics Co., Ltd., Seoul, Rep. of Korea

[21] Appl. No.: 697,775

[22] Filed: Aug. 29, 1996

[30] Foreign Application Priority Data

Aug. 31, 1995 [KR] Rep. of Korea ............... 95-28011
Aug. 31, 1995 [KR] Rep. of Korea ............... 95-28012

[51] Int. Cl.[6] .......................... H02K 15/00; B23P 19/04
[52] U.S. Cl. ........................... 29/732; 29/736; 29/893.1; 369/263
[58] Field of Search ................... 29/732, 736, 893.1, 29/893.2, 251; 369/263, 264, 270

[56] References Cited

U.S. PATENT DOCUMENTS

| | | | |
|---|---|---|---|
| 5,228,023 | 7/1993 | Hartog | 369/263 |
| 5,323,530 | 6/1994 | Goto et al. | 29/893.1 X |
| 5,495,660 | 3/1996 | Choi | 29/732 |

FOREIGN PATENT DOCUMENTS 274347  11/1988  Japan .................... 29/732

*Primary Examiner*—Peter Vo
*Attorney, Agent, or Firm*—Beveridge, DeGrandi, Weilacher & Young, LLP

[57] ABSTRACT

A driving motor fixing part for being installed with an attachable driving motor and a turntable assembly fixing part for being installed with an attachable turntable assembly are coaxially installed. The turntable assembly fixing part has a penetrating tunnel, and air from inside of the tunnel is exhausted by the exhausted so that the turntable assembly can be in tight contact with the turntable assembly fixing part. A pair of legs are extended downwardly from the turntable assembly fixing part, and then the legs are bent and extended to a central axis of the turntable assembly fixing part. Extended ends of the legs have axial side walls with predetermined widths which are closely disposed at the motor shaft to grasp the motor shaft. The ends prevents the motor shaft from being warped by axially biased force in pressing the motor shaft into the turntable assembly.

9 Claims, 5 Drawing Sheets

APPARATUS FOR AUTOMATICALLY PRESS-FITTING A TURNTABLE

BACKGROUND OF THE INVENTION

1. Field of the Invention

The present invention relates to an apparatus for automatically press-fitting a turntable, and more particularly to an apparatus for automatically press-fitting a turntable capable of minimizing an eccentric error by inserting a rotating shaft of a driving motor into a turntable assembly with significantly high precision.

2. Description of the Prior Art

Generally, an appliance such as optical video disc players, digital audio disc players and compact disc players is an apparatus for performing recording or reproducing operation with respect to a disc capable of magnetic recording or optical recording. In these appliances, the disc containing various audio signals or video signals is mounted to a turntable assembly of a corresponding disc player, and then the information is reproduced while rotating the disc by using the turntable assembly. U.S. Pat. No. 5,228,023 discloses an example of a construction and manufacturing method of the conventional turntable assembly.

The conventional turntable assembly will be described with reference to FIGS. 1 and 2 below.

FIG. 1 is an exploded perspective view showing the conventional turntable assembly, and FIG. 2 is a sectional view showing a joining state that the conventional turntable assembly is press-fitted into a driving motor.

Here, a reference numeral 10 denotes a spindle motor as a driving motor which is formed with a motor shaft 11 at an upper portion thereof. A supporting shaft member 20 is integrally formed with a cylindrical core portion 21 fitted with spindle motor shaft 11 and a supporting portion 22 for supporting a disc stand member 30. A plurality of insertion holes 24 are formed in the bottom plane of supporting portion 22 which has a circular groove 23 along the outer circumference thereof. Disc stand member 30 is shaped as a disc having an opening 32 in the center for receiving supporting shaft member 20 therethrough. The inner periphery of disc stand member 30 is engaged into outer circular groove 23 in supporting portion 22 of supporting shaft member 20. Disc stand member 30 is formed with a bending portion 31 which is upwardly bent for seating a disc thereon. A spring 60 is fitted to an upper portion of cylindrical core portion 21 of supporting shaft member 20. A pressing member 40 is put on cylindrical core portion 21 of supporting shaft member 20 coupled with spring 60. Pressing member 40 is formed with hook-like projections 41 directing downward to be respectively inserted to insertion holes 24 of supporting shaft member 20.

Then, as shown in FIG. 2, turntable assembly T is installed under the state of being inserted with motor driving shaft 11. While disc 50 is mounted to the upper portion of turntable assembly T, information within disc 50 can be reproduced by actuating the rotation of spindle motor 10.

As described above, turntable assembly T undergoes the assembling process under the state that spindle motor shaft 11 is forcibly press-fitted into cylindrical core portion 21 of supporting shaft member 20. A conventional apparatus for press-fitting the turntable employed for this process consists of a jig for holding the outer periphery of driving motor 10 at the lower side thereof and a magnetic chuck for electrically holding supporting shaft member 20 of turntable assembly T at the upper side thereof.

Under this state, the jig is moved upward and the magnetic chuck is moved downward to pressively fitting rotating shaft 11 of driving motor 10 fixed to the jig into the turntable fixed to the magnetic chuck, thereby assembling the elements.

In the above-mentioned conventional press-fitting process, however, when driving motor shaft 11 is press-fitted into cylindrical core portion 21 of supporting shaft member 20 of turntable assembly T, rotating shaft 11 of driving motor 10 is warped due to the press-fitting force exerting in the axial direction to cause an eccentric error around the motor shaft portion after finishing the press-fitting process. Furthermore, the outer periphery of driving motor 10 is held by means of the jig, and the outer periphery of turntable assembly T is held by means of the magnetic chuck to be highly probable to produce the eccentric error at the cylindrical core portion and motor shaft portion which are the center portion. For these reasons, turntable assembly T is not precisely joined with driving motor shaft 11 to be liable to shake cylindrical core portion 21 of turntable assembly T with the consequence of degrading playback accuracy when the disc is being reproduced.

SUMMARY OF THE INVENTION

It is an object of the present invention to provide an apparatus for automatically press-fitting a turntable capable of minimizing an eccentric error by inserting a rotating shaft of a driving motor into a turntable assembly with significantly high precision.

To achieve the above object of the present invention, an apparatus for automatically press-fitting a turntable includes a driving motor fixing part for installing a driving motor to be attachable/detachable state. Also, a turntable assembly fixing part for attachably/detachably installing a turntable assembly has a center arranged at an extending line of a motor shaft of said driving motor to permit a rotating axis of said turntable assembly to be accurately coaxial with said driving motor when the turntable assembly is installed thereto.

The present apparatus has also a motor shaft steadying part for steadying a motor shaft of the driving motor to be fixed by the driving motor fixing part. The motor shaft steadying part has a connecting portion extended downwardly from the turntable assembly fixing part and a motor shaft grasping portion which is bent from the connecting portion to be extended to a central axis of the turntable assembly fixing part and extended ends of driving motor shaft grasping portion are to grasp the motor shaft of the driving motor. The motor shaft steadying part has a space along which the motor shaft is inserted to the central axis and drawn out to outside in a direction orthogonal to the central axis. Here, a center of the motor shaft grasping portion is accurately coaxial with the rotating axis of the turntable assembly and the motor shaft.

The connecting portion of the motor shaft fixing part is extended downwardly from the turntable assembly fixing part. The connecting portion has a pair of legs which are symmetric with each other centering on the central axis.

The extended ends of motor shaft grasping portion are axial side walls with predetermined widths which are to grasp the motor shaft and which are closely arranged with the motor shaft for grasping the motor shaft. The axial side walls prevent the motor shaft from being warped by axially biased force in pressing the motor shaft into the turntable assembly.

It is preferable that the turntable assembly fixing part is formed with a guiding slot in the lower surface thereof. An elastic member exercising an elastic motion in the up and down direction is installed to the upper portion of the guiding slot within the turntable assembly fixing part, and a guide member is installed in contact with the elastic member at the lower portion of the elastic member. The guide member consists of a flat-type upper plane capable of performing the elastic motion by contacting the elastic member within the turntable assembly, and a guide rod for being inserted into a rotating shaft part of the turntable assembly while penetrating through the guiding slot to move in the up and down direction. The guide rod is installed such that the guide rod is exactly coaxial with the motor shaft of the driving motor when the guide rod is installed into the rotating shaft of turntable assembly.

The turntable assembly fixing part is provided with a penetrating tunnel which penetrates from an entrance of a surface in contact with the turntable assembly to an exit of a surface not in contact with the turntable assembly. The turntable assembly fixing part has an exhausted installed at an exit of the tunnel formed on a surface not in contact with the turntable assembly. In connecting the turntable assembly with the turntable assembly fixing part, air from inside of the penetrating tunnel is exhausted by the exhausted so that the turntable assembly can be in tight contact with the turntable assembly fixing part.

Preferably, the turntable fixing part is formed with an insertion lug at the lower surface thereof for being inserted/separated into/from a groove installed in an upper corresponding surface of a turntable portion, so that the turntable is firmly coupled to the turntable assembly fixing part when the driving motor shaft is press-fitted into the turntable assembly.

In view of the apparatus for automatically press-fitting the turntable, while the driving motor shaft is press-fitted into the rotating shaft of the turntable assembly, the motor shaft fixing part grips around the motor shaft for preventing the shaking of the motor shaft to inhibit the warping of the motor shaft. Therefore, the skew in the axial direction of the turntable can be prevented after the press-fitting process to enhance playback accuracy when the disc is reproduced.

In addition, since the turntable assembly is tightly contacted with the turntable assembly fixing part by using vacuum, turntable assembly does not shake in center nor separate from the turntable assembly fixing part in transferring of the turntable assembly. Thereby, accuracy is increased in the pressing operation of the motor shaft into the turntable assembly.

The assembling is carried out under the state that the rotating shaft portion of the turntable assembly and shaft portion of the driving motor are respectively gripped, so that the turntable assembly and driving motor shaft are joined with significantly high precision to further enhance the playback accuracy during the reproduction of the disc.

BRIEF DESCRIPTION OF THE DRAWINGS

The above objects and other advantages of the present invention will become more apparent by describing in detail preferred embodiments thereof with reference to the attached drawings in which.

DETAILED DESCRIPTION OF THE PREFERRED EMBODIMENT

Hereinbelow, an apparatus for automatically press-fitting a turntable according to the present invention will be described with reference to the accompanying drawings in detail.

Figure 1:
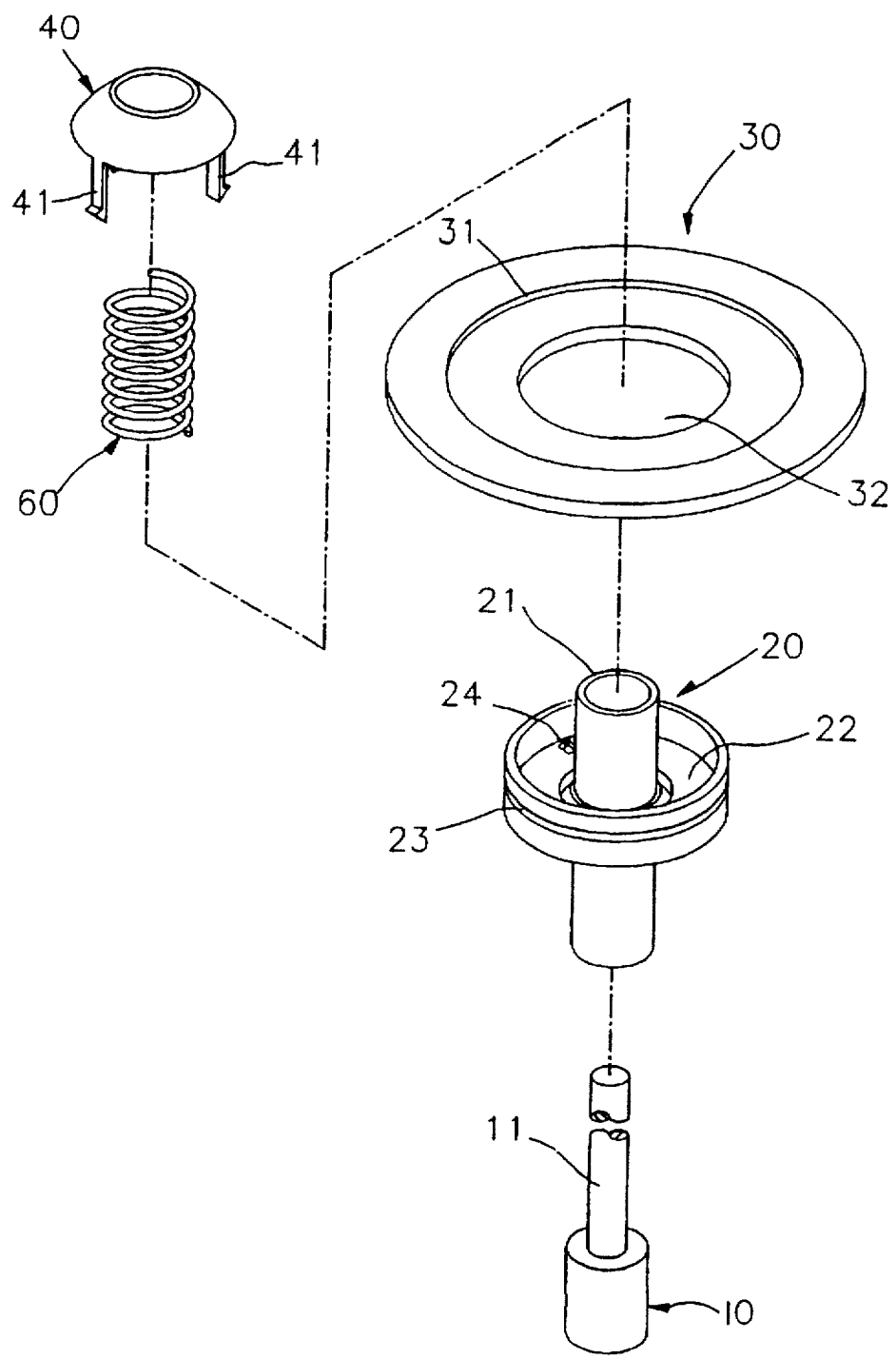
FIG. 1 is an exploded perspective view showing a conventional turntable assembly.
Figure 2:
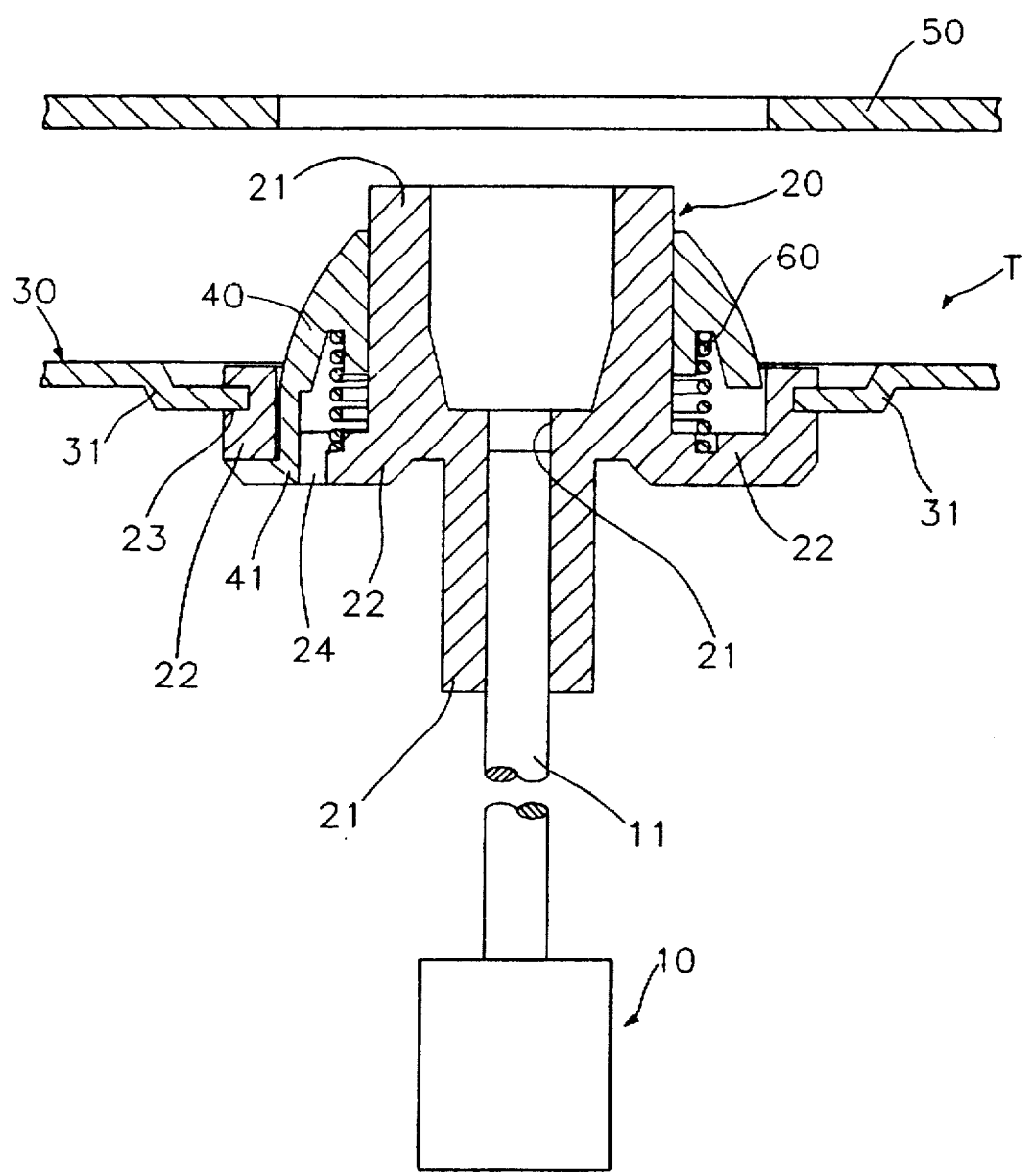
FIG. 2 is a sectional view showing a state of press-fitting the conventional turntable assembly into the driving motor.
Figure 3:
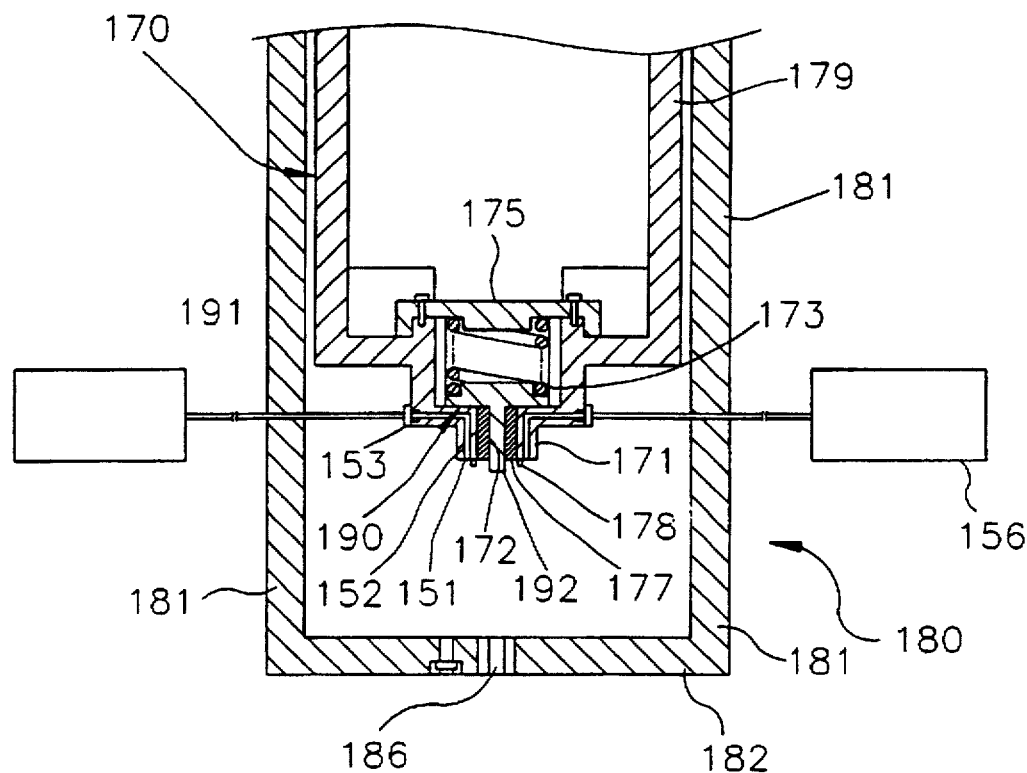
FIG. 3 is a diagrammatic section view showing an apparatus for automatically press-fitting a turntable according to the present invention.
Figure 3:
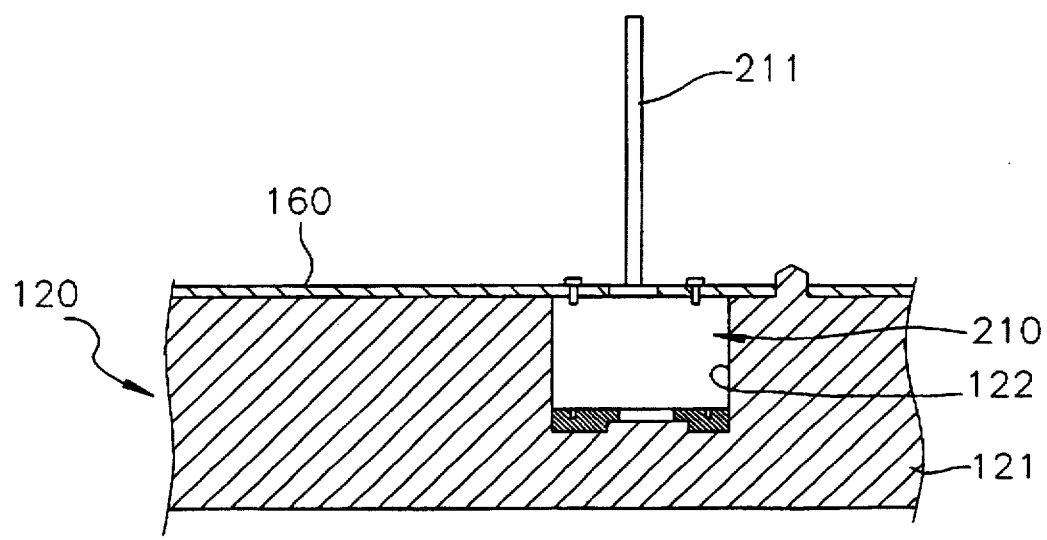
Figure 4:
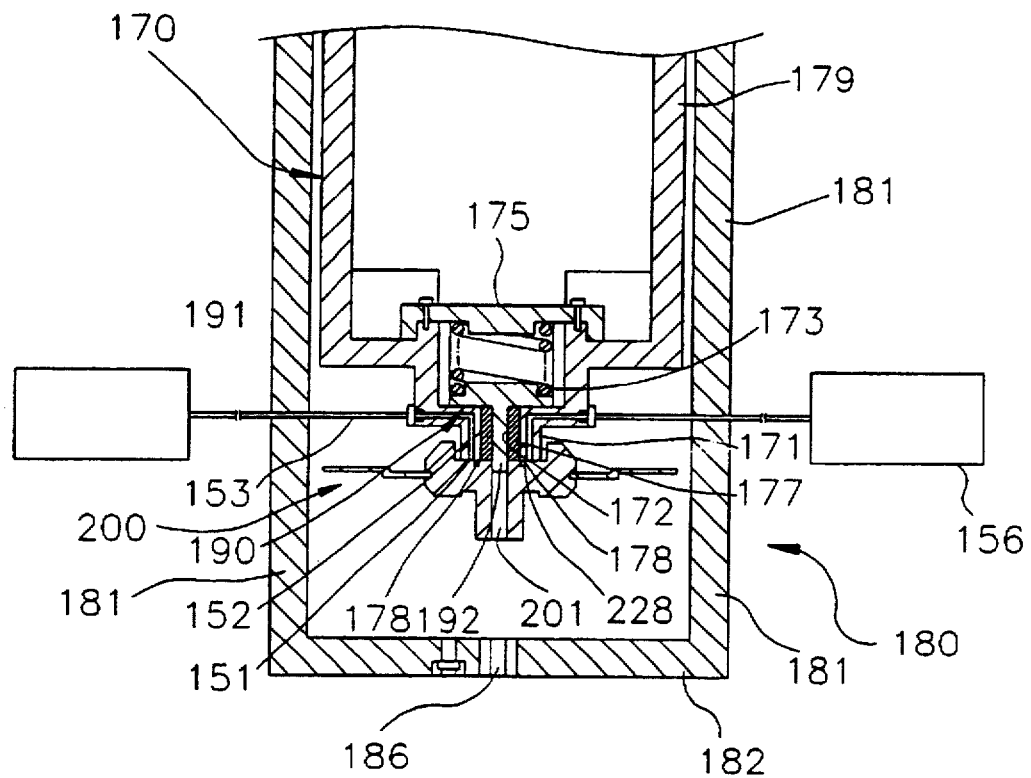
FIG. 4 is a sectional view showing a state that the turntable assembly and motor part are mounted to the apparatus for automatically press-fitting the turntable shown in FIG. 3 for inserting the motor driving shaft into the rotating shaft part of the turntable assembly.
Figure 4:
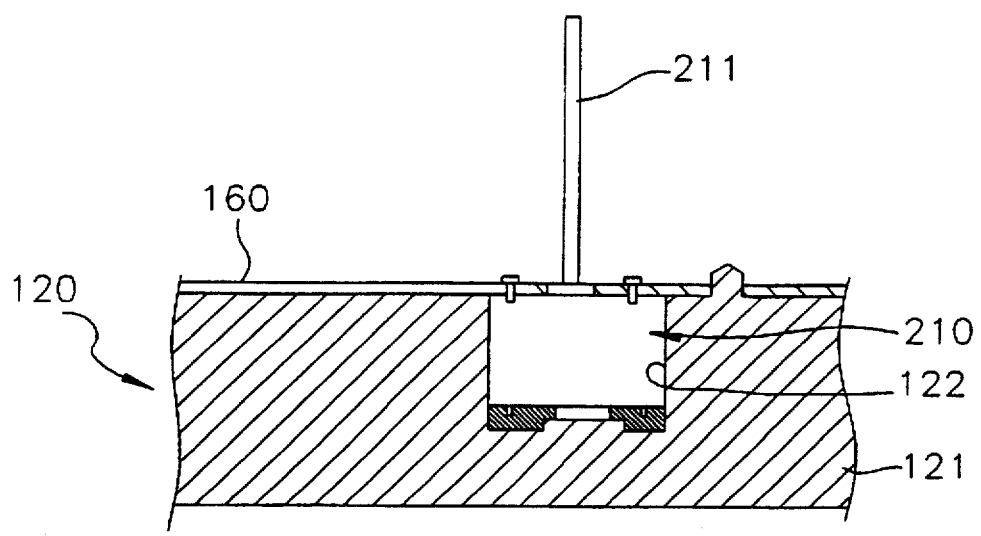
Figure 6:
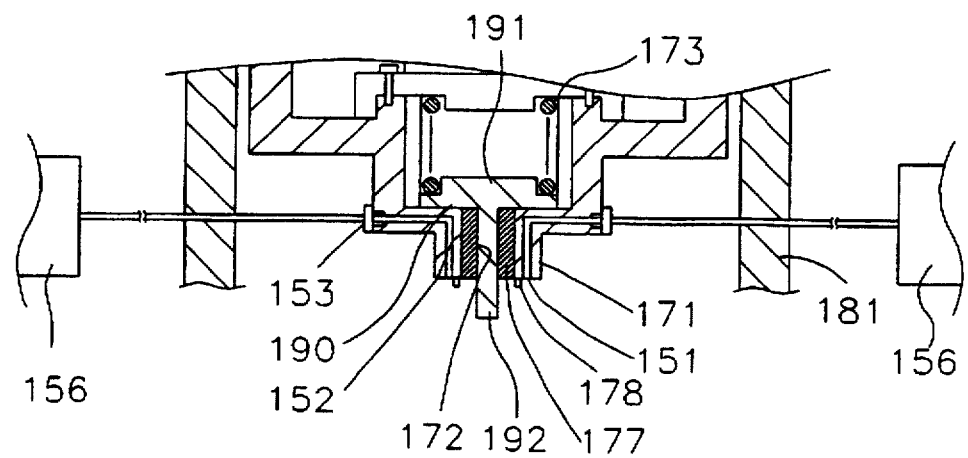
FIG. 6 is an enlarged sectional view showing a part of the apparatus for automatically press-fitting the turntable of FIG. 3.

FIG. 3 is a diagrammatic section view showing the apparatus for automatically press-fitting the turntable according to the present invention, and FIG. 4 is a sectional view showing a state that the turntable assembly and motor part are mounted to the apparatus for automatically press-fitting the turntable shown in FIG. 3 for inserting the motor driving shaft into the rotating shaft part of the turntable assembly. FIG. 6 is an enlarged sectional view showing a part of the apparatus for automatically press-fitting the turntable of FIG. 3.

As illustrated in FIGS. 3, 4 and 6, a reference numeral 120 denotes a driving motor fixing part for installing a driving motor 210 to be attachable/detachable to/from the interior thereof. Motor fixing part 120 is formed with a spindle motor installing groove 122 into which a spindle motor 210 is inserted.

A drive chassis 160 is provided for arranging a turntable assembly 200 joined with spindle motor 210 on the upper plane thereof when a disc is recorded/reproduced. Spindle motor 210 is screw-coupled to the lower portion of drive chassis 160 in such a manner that a motor shaft 211 of spindle motor 210 penetrates through drive chassis 160 to upwardly project in the vertical direction. Drive chassis 160 is installed onto a base 121 of motor fixing part 120 under the state that spindle motor 210 joined at the lower portion of drive chassis 160 is installed to spindle motor installing groove 122.

While spindle motor 210 is screw-coupled to drive chassis 160, spindle motor 210 is inserted into spindle Motor installing groove 122 of motor fixing part 120 provided to the lower portion of spindle motor 210.

A turntable assembly fixing part 170 is for attachably/detachably installing turntable assembly 200. Turntable assembly fixing part 170 allows the central axis thereof to be correctly arranged onto an extending line of driving motor shaft 211. By doing so, a rotating shaft 201 of turntable assembly 200 becomes exactly coaxial with motor shaft 211 of driving motor 210 when turntable assembly 200 is installed.

A motor shaft steadying part 180 is to support a motor shaft 211 of the driving motor 210 installed at the driving motor fixing part 120.

A connecting portion 181 is extended downwardly from the turntable assembly fixing part 170. The connecting portion 181 has a pair of legs which are symmetric with each other centering on the central axis.

A motor shaft grasping portion 182 is formed by being bent and extended from the legs of the connecting portion 181 toward a central axis of the turntable assembly fixing part 170. The motor shaft grasping portion 182 is extended to the central axis, and the extended ends of the motor shaft grasping portion 182 can be grasp the motor shaft 211 of the driving motor. The motor shaft grasping part 182 are accurately coaxial with the rotating axis 201 of the turntable assembly 200 and the motor shaft 211.

Along a space formed by the extended ends of motor shaft grasping portion 182, i.e., a guide opening, the motor shaft 211 before being contacted with turntable assembly 200 will be inserted to the central axis and the motor shaft 211 after being contacted with turntable assembly 200 will be drawn out to outside in a direction orthogonal to the central axis.

Here, two ends of the motor shaft grasping portion 182 have predetermined widths in axial direction. The motor shaft inserted into the central axis is grasped by axial side walls with the predetermined widths which are formed by the two ends of the motor shaft grasping portion 182. Thereby, the axial side walls prevent the motor shaft from being warped by axially biased force in pressing the motor shaft into the turntable assembly.

Meanwhile, turntable assembly fixing part 170 has an annular projection 171 inserted with a supporting shaft member 220 of turntable assembly 200 at the lower portion of the central axis thereof. Also, a guiding slot 172 for permitting annular projection 171 to pierce therethrough in the up and down direction is formed in turntable assembly fixing part 170. An elastic spring 173 is installed to the upper portion of guiding slot 172 within turntable assembly fixing part 170 to perform the elastic motion in the up and down direction.

An upper wall 175 is installed over the upper portion of elastic spring 173 to fix an upper end of elastic spring 173, and a guide pin 190 having a T-shaped section is installed to contact a lower end of elastic spring 173. Guide pin 190 is formed by a flat-type upper plane 191 and a guide rod 192 integrally connected with upper plane 191. Upper plane 191 of guide pin 190 is arranged in contact with the lower end of elastic spring 173 to be movable up and down within turntable assembly fixing part 170 dependent upon the elastic motion of elastic spring 173. Guide rod 192 of guide pin 190 is formed with upper plane 191 in a body, and inserted into rotating shaft 201 of turntable assembly 200 while moving up and down by piercing through guiding slot 172.

Thus, guide pin 190 arranged to exactly correspond guiding slot 172 of turntable assembly fixing part 170 to guide rod 192 is fitted into supporting shaft member 220 of turntable assembly 210. Accordingly, turntable assembly 210 can keep the balance rarely involving any error.

The turntable assembly fixing part 170 is provided with a penetrating tunnel 152 which penetrates from an entrance 151 of a surface in contact with the turntable assembly 200 to an exit 153 of a surface not in contact with the turntable assembly 200. The turntable assembly fixing part 170 has an exhausted 156 installed at the exit 153 formed on a surface not in contact with the turntable assembly 200. In connecting the turntable assembly 200 with the turntable assembly fixing part 170, air from inside of the penetrating tunnel 152 is exhausted by the exhausted 156 so that the turntable assembly 200 can be in tight contact with the turntable assembly fixing part 170.

Furthermore, turntable assembly fixing part 170 is formed with an insertion lug 178 to the lower plane of annular projection 171 which contacts the upper surface of a turntable when mounting turntable assembly 200. A groove 228 is formed in the upper corresponding surface of the turntable portion for receiving/separating insertion lug 178. By this construction, turntable assembly 200 is firmly joined to turntable assembly fixing part 170 while driving motor shaft 211 is press-fitted into turntable assembly 200.

A guide bearing 177 is installed to the sidewall of guiding slot 172 of turntable assembly fixing part 170 for facilitating the up and down motion of guide pin 190.

A reference numeral 179 denotes a cylindrical connecting member. Cylindrical connecting member 179 is connected with a device (not shown) for ascending and descending so as to move up and down turntable assembly fixing part 170 which is to be mounted with turntable assembly 200 to move up and down.

Now, an operation of the apparatus for automatically press-fitting the turntable will be described.

Figure 5:
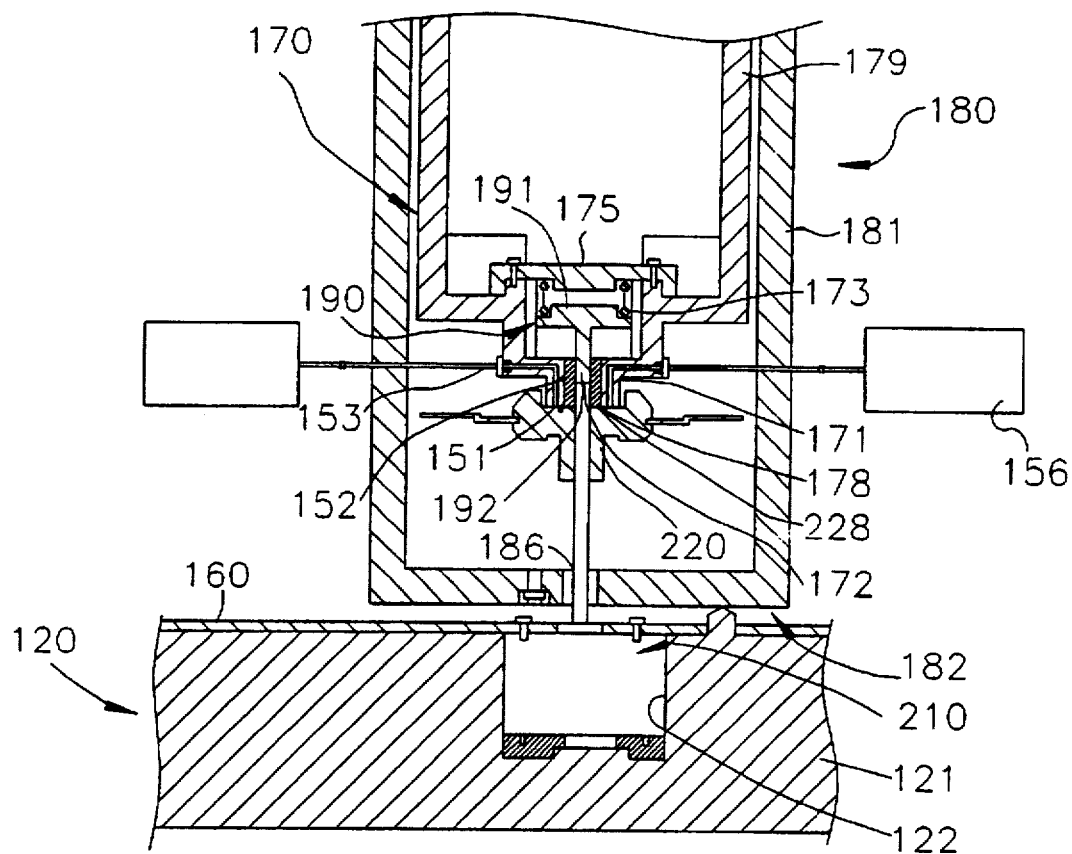
FIG. 5 is a sectional view showing a state that the motor driving shaft is inserted into the rotating shaft part of the turntable assembly by means of the apparatus for automatically press-fitting the turntable mounted with the turntable assembly and motor part.

FIG. 4 is the sectional view showing the state that the turntable assembly and motor part are mounted to the apparatus for automatically press-fitting the turntable shown in FIG. 3 for inserting the motor driving shaft to the rotating shaft part of the turntable assembly. FIG. 5 is a sectional view showing a state that the motor driving shaft is inserted to the rotating shaft part of the turntable assembly by means of the apparatus for automatically press-fitting the turntable mounted with the turntable assembly and motor part.

As shown in FIG. 4, in order to insert motor shaft 211 of driving motor 210 within supporting shaft member 220 of turntable assembly 200, supporting shaft member 220 of turntable assembly 200 is primarily fitted into annular, projection 171 of turntable fixing member 170. At this time, the end of guide pin 190 protruding from annular projection 171 after piercing through guiding slot 172 is inserted into rotating shaft 201 of turntable assembly 200, thereby accurately keeping the balance of turntable assembly 200. Then, turntable assembly 200 is joined by the magnetic force of turntable assembly fixing part 170.

Meantime, insertion lugs 178 formed to the lower plane of annular projection 171 of turntable assembly fixing part 170 are fitted into groove 228 formed in the corresponding portions of the upper surface of the turntable.

Air from inside of the penetrating tunnel 152 is exhausted by means of the exhausted 156 installed at the exit 153 formed on the surface not in contact with the turntable assembly. The turntable assembly 200 is in tight contact with the turntable assembly fixing part 170 depending on the vacuum degree of inside on penetrating tunnel 152.

While motor shaft 211 of spindle motor 210 upwardly protrudes in the vertical direction by piercing through a motor shaft through hole of drive chassis 160, spindle motor 210 is screw-coupled to drive chassis 160.

Under the state that spindle motor 210 is screw-coupled to drive chassis 160, spindle motor 210 is inserted into spindle motor installing groove 122 of motor fixing part 120 provided to the lower portion of spindle motor 210. Thereafter, motor fixing part 120 fixes driving motor 210 and drive chassis 160 installed with motor shaft 211 of driving motor 210 by means of a magnetic force.

The motor shaft grasping portion 182 is arranged such that the center of the motor shaft grasping portion 182 is accurately coaxial with the rotating axis 201 of the turntable assembly 200.

Then, when turntable assembly 200 is descend by descending cylindrical connecting member 179 of turntable assembly fixing part 170, the spindle motor shaft 211 is inserted along the central axis into the space 186 formed by the extended ends of motor shaft grasping portion 182, i.e., the guide opening 186. When the spindle motor shaft 211 has been inserted along the central axis through out the guide opening 186 of motor shaft steadying part 180, the motor shaft 211 is grasped and steadied by axial side walls with the predetermined widths which are formed by the two ends of the motor shaft grasping portion 182.

By continuously descending turntable assembly 200, the rotating axis 201 of turntable assembly 200 meets the top of the motor shaft 211, and then the motor shaft 211 is inserted into the rotating axis 201.

Since rotating axis 201 of turntable assembly 200 is accurately coaxial with motor shaft 211 of driving motor 210, motor shaft 211 is inserted to exactly correspond to supporting shaft member 220 of turntable assembly 200.

Vacuum of inside of penetrating tunnel 152 by exhausted 156 is released.

Successively, motor shaft 211 upwardly pushes guiding slot 172 and guide pin 190 having the T-shaped section movable up and down within guiding slot 172 of turntable fixing member 170. Here, guide rod 192 of the central axis of guide pin 190 is accurately coaxial with motor shaft 211 of driving motor 210.

Therefore, as shown in FIG. 5, guide member 190 is continuously pushed upward by motor shaft 211 and motor shaft 211 of driving motor 210 is completely inserted within supporting shaft member 220 of turntable assembly 200 while constricting spring 173 at the upper portion thereof.

The continuous descending of turntable assembly fixing part 170 further inserts spindle motor 210, and, therefore, guide rod 192 and insertion projection 178 are upwardly biased to be drawn out from turntable assembly 200. Accordingly, turntable assembly fixing part 170 is separated from turntable assembly 200.

Then, cylindrical connecting member 179 for ascending and descending is transferred in the horizontal direction (which is orthogonal to motor shaft), and thereby, turntable assembly fixing part 170 and motor shaft steadying part 180 connected therewith is transferred in the horizontal direction (which is orthogonal to motor shaft 211) through guide opening 186. Thus, motor shaft 211 and turntable assembly 200 connected therewith are completely free from turntable assembly steadying part 170 and motor shaft fixing part 180.

Thereafter, turntable assembly fixing part 170 and motor shaft fixing part 180 are ascended to the original position thereof by cylindrical connecting member 179. At this time, guide member 190 returns to the original state by the restoring force of elastic spring 173.

By doing so, the press-fitting of driving motor 210 with respect to turntable assembly 200 is completed.

Driving motor 210 installed to drive chassis 160 and turntable assembly 200 press-fitted into motor shaft 211 of driving motor 210 according to the above-described process are employed as one constituent during manufacturing an optical disc player.

In the apparatus for automatically press-fitting the turntable constructed as above, when the driving motor shaft is press-fitted into the rotating shaft portion of the turntable assembly, the motor shaft is held to be gripped by the motor shaft fixing part around the motor shaft not to be shaken. As the result, the warpage of the motor shaft caused by the press-fitting force in the axial direction is prevented to inhibit the skew in the axial direction of the turntable after finishing the press-fitting process, thereby raising playback accuracy during the reproduction of the disc.

In addition, since the turntable assembly is in tight contact with the turntable assembly fixing part by using vacuum, turntable assembly does not shake in center nor separate from the turntable assembly fixing part in its transferring. Thereby, accuracy is increased in the pressing operation of the motor shaft into the turntable assembly.

Additionally, the joining of the rotating shaft part of the turntable assembly and shaft part of the driving motor is carried out with the significantly high precision while being respectively settling them to further raise playback accuracy during the reproduction of the disc.

While the present invention has been particularly shown and described with reference to particular embodiment thereof, it will be understood by those skilled in the art that various changes in form and details may be effected therein without departing from the spirit and scope of the invention as defined by the appended claims.

What is claimed is:

1. An apparatus for automatically press-fitting a turntable comprising:

a driving motor fixing part for being installed with an attachable driving motor;

a turntable assembly fixing part for being installed with an attachable turntable assembly, said turntable assembly fixing part being connected with the turntable assembly so as to align a central axis of said turntable assembly fixing part and a rotating shaft of said turntable assembly, the central axis of said turntable assembly fixing part and the rotating shaft of said turntable assembly being arranged on an extended line of a motor shaft of the driving motor, so that the rotating shaft of the turntable assembly can be accurately coaxial with the driving motor when the turntable assembly is installed at the turntable assembly fixing part; and a motor shaft steadying part for steadying a motor shaft of the driving motor to be fixed by the driving motor fixing part, the motor shaft steadying part having a connecting portion and a motor shaft grasping portion, wherein the connecting portion is connected with the turntable assembly fixing part to be extended downwardly from the turntable assembly fixing part, and a motor shaft grasping portion is bent from lower ends of the connecting portion to be extended to the central axis of said turntable assembly fixing part, and the extended ends of the motor shaft grasping portion form a space for grasping the motor shaft, and the space formed by the extended ends is positioned accurately coaxially with the rotating shaft of the turntable assembly to be coaxial with the motor shaft so that the extended ends of the motor shaft grasping portion serve to steady the motor shaft of the driving motor, whereby the motor shaft of the driving motor can be inserted into the rotating shaft of the turntable assembly while the motor shaft of the driving motor is stably steadied by the motor shaft steadying part.

2. The apparatus for automatically press-fitting a turntable as claimed in claim 1, wherein the connecting portion of the motor shaft steadying part is composed of a plurality of legs which are extended downwardly from the turntable assembly fixing part, and each leg is symmetric with each other.

3. The apparatus for automatically press-fitting a turntable as claimed in claim 1, wherein the extended ends of motor shaft grasping portion have axial side walls with predetermined widths which are to grasp the motor shaft and closely disposed at the motor shaft for grasping the motor shaft.

4. The apparatus for automatically press-fitting a turntable as claimed in claim 1, wherein the turntable assembly fixing part further comprises a penetrating tunnel which penetrates from an entrance of a surface in contact with the turntable assembly to an exit of a surface not in contact with the turntable assembly, and an exhausting means installed at an exit of the tunnel formed on a surface not in contact with the turntable assembly, wherein, when the turntable assembly is connected to the turntable assembly fixing part, air from inside of the penetrating tunnel is exhausted by the exhausting means so that the turntable assembly can be in tight contact with the turntable assembly fixing part.

5. The apparatus for automatically press-fitting a turntable as claimed in claim 1, wherein said turntable fixing part is formed with an insertion lug at the lower surface thereof to be inserted into a groove installed in an upper corresponding surface of a turntable assembly to permit said turntable assembly to be firmly coupled to said turntable assembly fixing part.

6. The apparatus for automatically press-fitting a turntable as claimed in claim 1, wherein said turntable assembly fixing part comprises a guiding slot in the lower surface thereof and a guide member formed with a guide rod for being inserted into a rotating shaft portion of said turntable assembly while penetrating through said guiding slot to move in the up and down directions.

7. The apparatus for automatically press-fitting a turntable as claimed in claim 1, wherein an elastic member exercising an elastic motion in the up and down direction is installed to the upper portion of said guiding slot within said turntable assembly fixing part, and said guide member is installed in contact with said elastic member at the lower portion of said elastic member for executing the elastic motion by contacting said elastic member within said turntable assembly.

8. An apparatus for automatically press-fitting a turntable comprising:

a driving motor fixing part for being installed with an attachable driving motor;

a turntable assembly fixing part for being installed with an attachable turntable assembly, said turntable assembly fixing part being connected with the turntable assembly so as to align a central axis of said turntable assembly fixing part and a rotating shaft of said turntable assembly, the central axis of said turntable assembly fixing part and the rotating shaft of said turntable assembly being arranged on an extended line of a motor shaft of the driving motor to permit a rotating shaft of the turntable assembly to be accurately coaxial with the driving motor when the turntable assembly is installed at the turntable assembly fixing part; and a motor shaft supporting part for steadying a motor shaft of the driving motor to be fixed by the driving motor fixing part, the motor shaft steadying part having a connecting portion and a motor shaft grasping portion, a connecting portion which is composed of a plurality of legs which are extended downwardly from the turntable assembly fixing part, and each leg is symmetric with each other, and a motor shaft grasping portion which is bent from ends of the legs toward the central axis to be extended to the central axis of said turntable assembly fixing part, and the extended ends of the motor shaft grasping portion form a space, and the space formed by the extended ends is positioned accurately coaxially with the rotating shaft of the turntable assembly to be coaxial with the motor shaft so that the extended ends of the motor shaft grasping portion serve to steady the motor shaft of the driving motor, whereby the motor shaft of the driving motor can be inserted into the rotating shaft of the turntable assembly while the motor shaft of the driving motor is stably steadied by the motor shaft steadying part.

9. An apparatus for automatically press-fitting a turntable comprising:

a driving motor fixing part for for being installed an attachable driving motor;

a turntable assembly fixing part for being installed with an attachable turntable assembly, said turntable assembly fixing part being connected with the turntable assembly so as to align a central axis of said turntable assembly fixing part and a rotating shaft of said turntable assembly, the central axis of said turntable assembly fixing part and the rotating shaft of said turntable assembly being arranged on an extended line of a motor shaft of the driving motor to permit a rotating shaft of the turntable assembly to be accurately coaxial with the driving motor when the turntable assembly is installed at the turntable assembly fixing part;

the turntable assembly fixing part having a penetrating tunnel which penetrates from an entrance of a surface in contact with the turntable assembly to an exit of a surface not in contact with the turntable assembly, and an exhausting means installed at an exit of the tunnel formed on a surface not in contact with the turntable assembly, wherein, in connecting the turntable assembly with the turntable assembly fixing part, air from inside of the penetrating tunnel is exhausted by the exhausting means so that the turntable assembly can be in tight contact with the turntable assembly fixing part; and a motor shaft steadying part for steadying a motor shaft of the driving motor to be fixed by the driving motor fixing part, the motor shaft steadying part having a connecting portion and a motor shaft grasping portion, a connecting portion which is composed of a plurality of legs which are extended downwardly from the turntable assembly fixing part, and each leg is symmetric with each other, and a motor shaft grasping portion which is bent from ends of the legs toward the central axis to be extended to the central axis of said turntable assembly fixing part, and the extended ends of the motor shaft grasping portion form a space, and the space formed by the extended ends is positioned accurately coaxially with the rotating shaft of the turntable assembly to be coaxial with the motor shaft so that the extended ends of the motor shaft grasping portion serve to steady the motor shaft of the driving motor, whereby the motor shaft of the driving motor can be inserted into the rotating shaft of the turntable assembly while the motor shaft of the driving motor is stably steadied by the motor shaft steadying part.

* * * * *